May 9, 1950     W. D. HERSHBERGER     2,506,785
PULSE-ECHO SYSTEM FOR INDICATING ANGLES
Original Filed Nov. 2, 1942     3 Sheets-Sheet 1
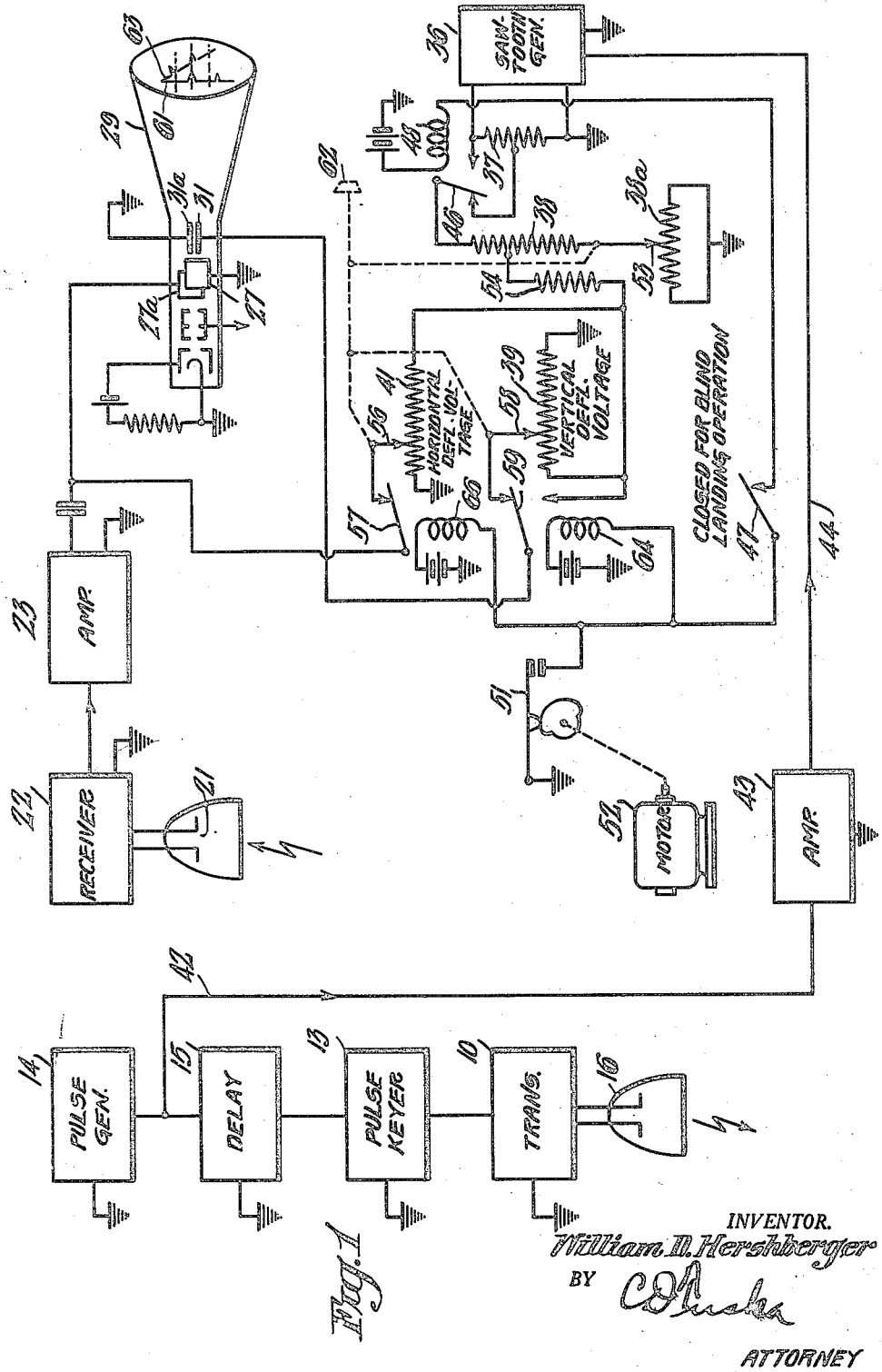
INVENTOR.
William D. Hershberger
BY
ATTORNEY

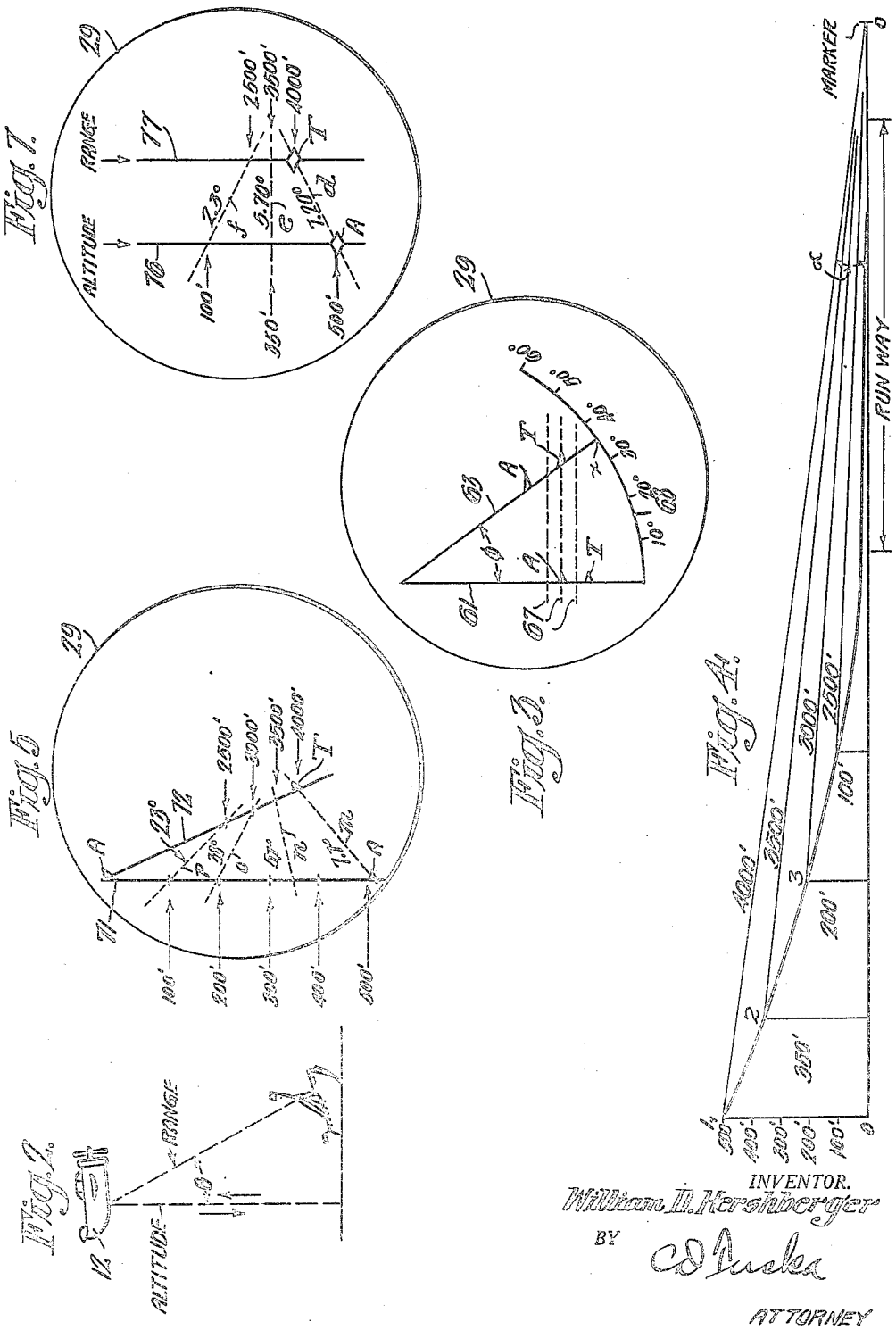

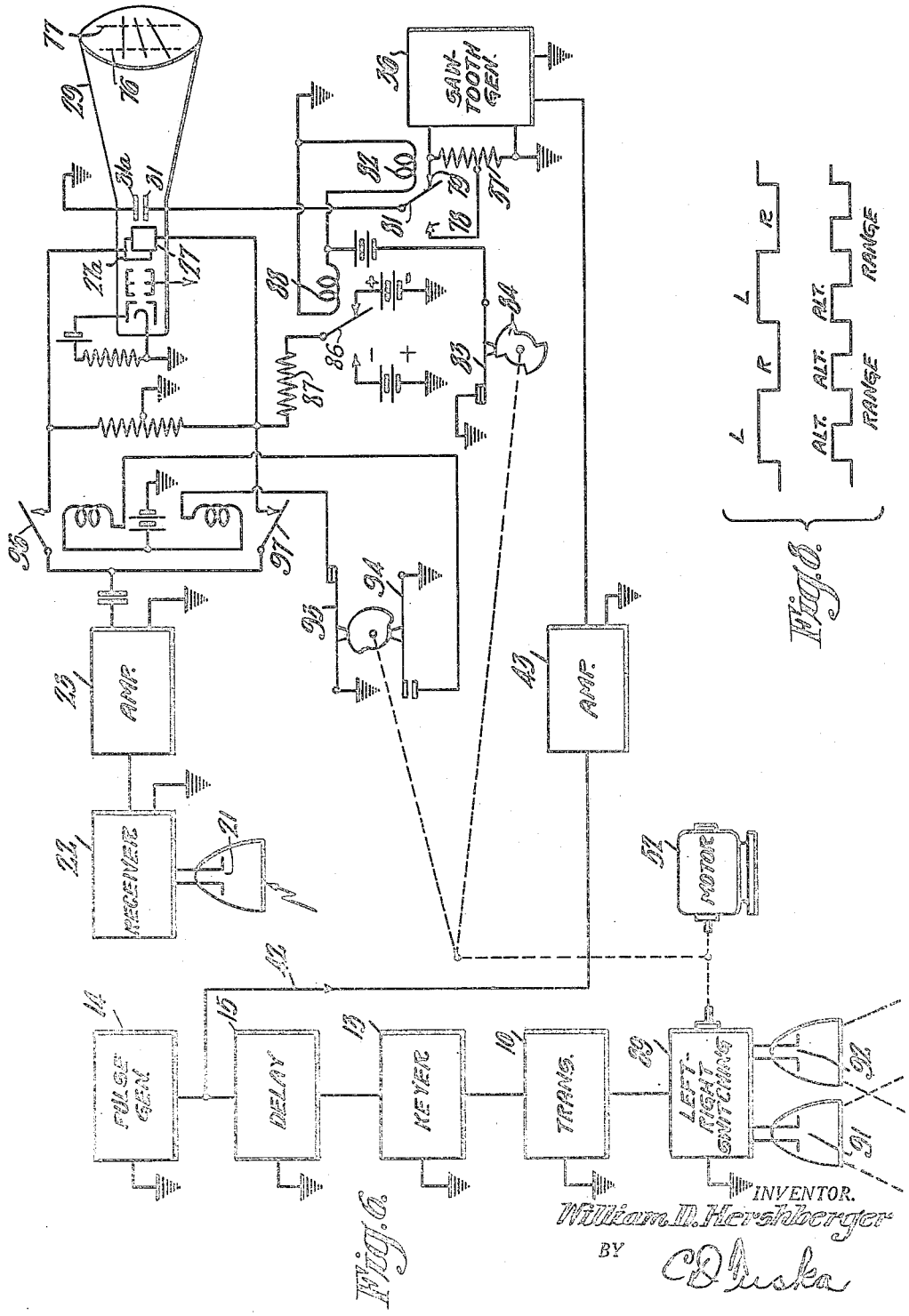

Patented May 9, 1950

2,506,785

UNITED STATES PATENT OFFICE 2,506,785

PULSE-ECHO SYSTEM FOR INDICATING ANGLES

William D. Hershberger, Princeton, N. J., assignor to Radio Corporation of America, a corporation of Delaware Original application November 2, 1942, Serial No. 464,291, now Patent No. 2,430,292, dated November 4, 1947. Divided and this application December 29, 1944, Serial No. 570,266

5 Claims. (Cl. 343—11)

This application is a division of my copending United States application Serial No. 464,291, filed November 2, 1942, entitled Radio angle indicator, now Patent 2,430,292 issued November 4, 1947.

My invention relates to radio-echo or similar systems for angle measurements and particularly to a radio system for measuring angles such as the angle formed by a line from an aircraft to an object on the earth's surface and a perpendicular line from the aircraft to earth. The object may be a ship or other target to be bombed from the aircraft.

An object of the invention is to provide an improved method of and means for measuring an angle between lines joining a point of signal radiation and two points on a surface where one of the other angles of the triangle formed by said lines and a line between said two points on said surface is a fixed known angle.

A further object of the invention is to provide an improved system of the above-described type for determining the said angle between the perpendicular and the line to the target or other reflecting surface.

A further object of the invention is to provide an improved system in which measurement of the said angle is independent of the attitude of aircraft.

A further object of the invention is to provide an improved system of the above-described type for determining the said angle even though the ship or other target is not visible.

A further object of the invention is to provide an improved system of the above-described type in which the angle measurement may be read directly from a scale or the like.

A still further object of the invention is to provide an improved system for landing of aircraft by instruments.

In one preferred embodiment of the invention, an aircraft is provided with a radio pulse-echo system which radiates a signal downward and forward whereby reflections that are a measure of altitude will be received from the earth directly below the plane while other reflections will be received from the target ahead. Since the first occurring reflections will be a measure of the altitude or distance perpendicular to the earth, the angle $\theta$ between this perpendicular line and the line from the aircraft to the target can be determined when the range or distance to the target is also known. The latter distance is shown by a later occurring reflection from the target. From the fact that the distance to the target divided by the altitude is the secant of the angle $\theta$, the angle $\theta$ may be calculated. In accordance with my invention, however, the apparatus is so designed that the angle $\theta$ is read directly off a scale without the necessity of any calculations.

This may be accomplished in accordance with my invention by causing the cathode ray of the indicator tube to be deflected alternately along two deflection paths or traces, one of them being a vertical trace produced by a sawtooth wave on the vertical deflecting plates only and the other being a trace positioned at an angle with respect to the vertical trace and produced by applying the sawtooth to both the vertical and the horizontal deflecting plates. The altitude and target pulse indications appear on these traces. The desired angle $\theta$ (Fig. 2) may be determined by keeping the two traces of equal length and by making the angle $\phi$ (Fig. 3) between them such that the target pulse indication on the angularly located trace and the altitude pulse indication on the vertical trace fall on the same horizontal line, i. e., by making them horizontally coincident. The angle $\phi$ between the two traces is now equal to the desired angle $\theta$ and may be read from an angle scale marked on the face of the indicator tube. Other embodiments of the invention will be described hereinafter.

The invention will be better understood from the following description taken in connection with the accompanying drawing in which Figure 1 is a block and circuit diagram showing one embodiment of the invention, Figure 2 is a diagram showing the relation between the altitude echo path, the target echo path and the angle $\theta$, Figure 3 is a view representing the screen end of the indicator tube of Fig. 1 with cathode ray traces and pulse indications thereon as they appear when utilizing the embodiment of Fig. 1, Figure 4 is a diagram illustrating the desired glide path for an airplane of a particular type in making a landing, Figure 5 is a view which is the same as that of Fig. 3 except that it illustrates the traces and pulse indications for the condition when the system of Fig. 1 is employed for making an instrument landing, Figure 6 is a block and circuit diagram illustrating another embodiment of the invention that is particularly adapted for use in making instrument landings, Figure 7 is a view representing the screen end of the indicator tube of Fig. 6 with the cathode ray traces and pulse indications thereon, and Figure 8 is a pair of graphs showing how left-right indication is applied to the system of Fig. 6.

In the several figures, like parts are indicated by similar reference characters.

In Fig. 1, a high frequency radio transmitter 10, which is mounted on an aircraft 12 (Fig. 2), is keyed by means of a pulse keyer 13 connected to a keying pulse generator 14 through a delay network 15 to radiate short radio pulses downward and forward from a suitable antenna system 16, which is illustrated as a dipole in a parabolic reflector. The transmitted pulses may occur at a rate of 3500 per second and have a duration of 0.3 microsecond, for example.

The reflected or echo pulses are picked up by a suitable antenna such as a dipole 21 and supplied to a receiver 22 (also on the aircraft) which amplifies and demodulates them. They are further amplified by an amplifier 23 and applied through a coupling capacitor to a pair of horizontal deflecting elements 27 and 27a of a cathode ray indicator tube 29. The cathode ray tube 29 may be of conventional design and is provided with a pair of vertical deflecting elements 31 and 31a positioned at right angles to the other pair of elements.

A deflecting voltage generator 36 supplies a linear sawtooth voltage across an output resistor 37. This deflecting voltage is applied in the manner described below through manually adjustable potentiometers 38—38a, 39 and 41 to the deflecting elements of tube 29. The sawtooth generator 36 is synchronized with the pulse transmission by means of pulses from the pulse generator 14 supplied thereto through a conductor 42, an amplifier 43 and a conductor 44.

The upper end of resistor 38 of the gain control potentiometer 38—38a is connected through a relay armature 46 either to an intermediate point on resistor 37 or to the upper end of resistor 37, the first position being for the operation when measuring angles as illustrated in Fig. 3. It is only for blind landing operation or the like that a switch 47 is closed whereby the armature 46 is pulled periodically into contact with the upper end of resistor 37 by a relay coil 48. Such periodic operation of the armature 46, with the resulting periodic change in magnitude of cathode ray deflection is obtained by means of a cam operated switch 51 driven by a motor 52.

The lower end of resistor 38 is connected through a variable tap 53 to a point on the resistor 38a which is connected at each end through ground to the lower end of output resistor 37. Moving the tap 53 in either direction from the center position results in a reduction in the amplitude of the deflecting voltage applied to potentiometer resistors 39 and 41 since the relative circuit impedances are such that there is substantially no change in the current flow through the resistors 38 and 38a resulting from a change in the position of the tap 53. Opposite ends of resistors 39 and 41, respectively, are connected through a resistor 54 to a point on resistor 38. The other ends of resistors 39 and 41 are grounded.

Horizontal deflecting voltage is supplied periodically from resistor 41 to the deflecting elements 27—27a through a variable tap 56 and a relay armature 57. Vertical deflecting voltage is supplied from resistor 39 to the vertical deflecting elements 31—31a through a variable tap 58 and a relay armature 59, this voltage being supplied alternately with reduced amplitude (depending on the position of tap 58) and with full amplitude. When it is supplied with full amplitude, the armature 59 is in its lower position and the armature 57 is disconnected from the horizontal deflection supply whereby the vertical deflection trace 61 (Figs. 1 and 3) is produced.

During the instant that the vertical deflection voltage is supplied with less than full amplitude, the armatures 59 and 57 are in their upper positions and the cathode ray is being deflected both vertically and horizontally by amounts determined by the positions of the taps 53, 56 and 58 which are ganged together for manual adjustment by operating a control knob 62 as indicated by the broken lines. This simultaneous vertical and horizontal deflection produces the trace 63 (Figs. 1 and 3). The armatures 59 and 57 are actuated by means of relay coils 64 and 66, respectively, which are energized periodically and simultaneously by the closing of the cam operated switch 51.

When the taps 58 and 56 are positioned at points where the vertical and horizontal voltages are equal, the trace 63 is at 45 degrees with respect to the vertical trace 61 and is of minimum length for a given amplitude of deflecting voltage. Therefore, when taps 58 and 56 are so positioned, the tap 53 is positioned at the center of resistor 38a, this being its position for maximum voltage. If the control knob 62 is turned to move the taps 56 and 58 to the right of the above-mentioned equal-voltage position, the vertical deflection is decreased in amplitude and the horizontal deflection is increased in amplitude whereby the trace 63 swings away from the vertical trace 61. Simultaneously, the tap 53 moves to the right to decrease the amplitude of the deflecting voltage by the correct amount for keeping the length of the trace unchanged. Likewise, if the taps 56, 58 and 53 are moved to the left of said position the trace 63 swings toward the vertical trace 61. As before, its length does not change. In order to make the amplitude of the deflecting voltage decrease in the desired manner as the tap 53 is moved, it may be desirable to have the resistance of resistor 38a tapered instead of having it change linearly with respect to the position of the tap 53.

The cam switch 51 preferably is closed periodically at a rate that is high enough to make the traces 61 and 63 appear to an observer to be on the cathode ray screen at the same time.

In order to determine the angle $\theta$ between the vertical and the line of sight to a target (Fig. 2), the potentiometer knob 62 is adjusted until the angular trace 63 is swung through such an angle $\phi$ that the target echo pulse indication T thereon and the altitude echo pulse indication A of the vertical trace 61 are horizontally coincident, as shown in Fig. 3. The condition of horizontal coincidence is obtained when the above-mentioned indications T and A fall on the same horizontal line such as one of a plurality of lines 67 marked on the face of the tube 29. The angle $\phi$ now equals the angle $\theta$ and its value may be read at the point $x$ on an angle scale 68 where the end of trace 63 falls on or adjacent to the angle scale. The reason that the above-described procedure gives the desired angle is that the geometry of the two cathode ray traces 61 and 63 and the horizontal line of coincidence correspond exactly to the geometry of the altitude, target distance and ground level, respectively, indicated in Fig. 2.

My system may be employed for instrument landings of airplanes if the landing field is provided with a marker such as a reflector or retransmitter to give the pulse-echo indication T. For example, an airplane equipped with my system can be brought into a landing field along a straight line glide path if the pilot will keep his altitude such that the altitude and marker indications A and T, respectively, remain horizontally coincident.

Some pilots prefer changing the angle of the glide path during a landing as shown, by way of example, in Fig. 4. An airplane may be landed in this way with my system and without adjusting the control knob 62 if the switch 47 (Fig. 1) is closed. This pulls the armature 46 against its right-hand contact point whereby the deflecting voltage is of increased amplitude during the time the cathode ray is deflected vertically along the trace 71 (Fig. 5). This gives the vertical trace an expanded scale which is desirable because of the low altitude of the airplane during landing. The altitude indication A and the target or marker indication T appear on the useful lengths of the traces 71 and 72, respectively. The target or marker pulse T may not appear on the trace 71 (although it always appears on trace 72) or it may appear on trace 71 only when the landing is substantially completed. The altitude indication A will not appear on the useful portion of trace 72; instead it will be near the upper end of the trace 72 or may not even be visible on trace 72 (although it always appears on trace 71). A plurality of lines such as $m$, $n$, $o$ and $p$ may be drawn across the face of the tube 29 to intersect the traces 71 and 72 at the points where the pulse indications A and T, respectively, will fall if the airplane is coming in at the desired glide angle.

For example, at 4000' from the marker (Fig. 4) the pilot has dropped to an altitude of 500' where the proper glide angle is indicated by the 7.2° line $m$. It should be noted that 7.2° is the value of the angle $a$ (Fig. 4) rather than the value of the glide angle itself. The airplane may be held at the indicated glide angle until point 2 (Fig. 4) is reached, at which point the angle may be changed to that indicated by the 5.7° line $n$. Similarly, the glide angle may be changed at other predetermined altitudes as the airplane approaches the runway. In practice, a pilot would probably change the glide angle gradually, watching the altitude and marker indications to see that the altitude and marker indications A and T, respectively, are approaching the index lines $m$, $n$, $o$, etc. in the proper manner.

Fig. 6 illustrates another embodiment of the invention which is designed particularly for the instrument landing of aircraft. In this embodiment, the sawtooth deflecting voltage is applied to the vertical deflecting plates 31 and 31$a$ only. The simultaneous application of centering voltages results in the production of vertical traces 76 and 77 as shown in Fig. 7. Just as in Fig. 5, the trace 76 for indicating altitude has an expanded scale.

The traces 76 and 77 are obtained by applying the saw-tooth deflecting voltage to the deflecting plates 31 and 31$a$ through one of the two contact points 78 and 79 and a relay armature 81. The armature 81 is pulled from one contact point to the other by a relay coil 82 that is energized by a switch 83. The switch 83 is operated by a cam 84 which is driven by the motor 52.

When the armature 81 is in the position shown for producing the expanded scale trace 76, a positive centering voltage is applied to the deflecting plate 27 through a relay armature 86 and a resistor 87. This pulls the vertical deflection to one side of center. When the armature 81 is in the other position for applying a deflecting voltage of smaller amplitude, thus producing the trace 77, the armature 86 is in its other position to apply a negative bias to the deflecting plate 27. This pulls the vertical deflection to the other side of center. The armature 86 is actuated in synchronism with the armature 81 by a relay coil 88.

The operation of the system is similar to that described in connection with Fig. 5. A plurality of lines such as $d$, $e$ and $f$ are drawn across the face of the tube 29 to intersect the traces 76 and 77 at the points where the altitude and target (marker) pulses A and T, respectively, appear when the airplane is on the desired glide path.

Preferably, the system of Fig. 6 includes left-right indication. This may be provided by supplying the output of transmitter 10 through a left-right switching device 89 to a pair of directional antennas 91 and 92 having overlapping radiation patterns. Switching device 89 is driven by the motor 52 which also drives the cam operated switches 93 and 94. Switches 93 and 94 control a pair of relay armatures 96 and 97, respectively, to apply the echo pulses alternately to the horizontal deflecting plates 27$a$ and 27, respectively. Thus, the cathode ray is deflected to the left by the echo pulse when the radiation is from the antenna having the left-hand radiation pattern and it is deflected to the right when the radiation is from the other antenna. When the airplane on which the system is mounted is headed directly for the landing field marker, the left and right deflections are of the same amplitude and the pilot knows he is approaching the runway correctly. This condition is illustrated at A and T in Fig. 7.

One satisfactory switching sequence is illustrated in Fig. 8 where left and right switching periods are shown at L and R. The corresponding switching periods to produce the altitude and range or marker traces 76 and 77 are shown at "alt." and "range," respectively. It will be seen that one altitude trace 76 and one range trace 77 are produced while signal is radiated toward the left. These two traces are again produced while signal is being radiated toward the right. It will be understood that the rate of switching is not critical but with a given cathode ray tube screen having a certain persistence of fluorescence it should be high enough to make the altitude and range traces visible simultaneously without too much flicker.

I claim as my invention:

1. In a system for indicating on the screen of a cathode ray tube the angle between a line from an aircraft to a finite object on the earth's surface and a line perpendicular from the aircraft to the earth, the earth's surface being level from the point where said perpendicular line strikes said surface to said object, a cathode ray tube having a screen and having means for producing a cathode ray and directing it at said screen, means for transmitting radio pulses toward the earth from said aircraft and for initiating alternately at approximately the time of transmission of each pulse a deflection of the cathode ray to produce a certain time trace on said screen and a deflection of the cathode ray along a different path to produce a time trace on said screen spaced away from said certain trace and in a fixed relation thereto, said time traces having time bases that have a predetermined relation to each other, means for receiving said pulses after reflection from said surface and from said object, means for applying the received pulses to said tube to alter the cathode ray during its deflection to produce a visual indication whereby the altitude indication appears on one trace and the object indication appears on the other trace, and a plurality of lines drawn over said screen to intersect said traces, each line intersecting one trace where the altitude indication appears for a certain altitude and intersecting the other trace where the object indication appears for a certain value of said angle.

2. In a system for indicating on the screen of a cathode ray tube the angle between a line from an aircraft to a finite object on the earth's surface and a line perpendicular from the aircraft to the earth, the earth's surface being level from the point where said perpendicular line strikes said surface to said object, a cathode ray tube having a screen and having means for producing a cathode ray and directing it at said screen, means for transmitting radio pulses toward the earth from said aircraft and for initiating alternately at approximately the time of transmission of each pulse a vertical deflection of the cathode ray to produce a vertical time trace on said screen and a horizontally displaced vertical deflection of the cathode ray to produce a second vertical time trace on said screen, said time traces having time bases that have a predetermined relation to each other, means for receiving said pulses after reflection from said surface and said object, means for applying the received pulses to said tube to alter the cathode ray during its deflection to produce a visual indication whereby the altitude indication appears on the first trace and the object indication appears on the second trace, and an index line drawn over said screen to intersect the first trace where the altitude indication appears for a certain altitude and to intersect the other trace where the object indication appears for a certain value of said angle.

3. In a system for indicating on the screen of a cathode ray tube the angle between a line from an aircraft to a finite object on the earth's surface and a line perpendicular from the aircraft to the earth, the earth's surface being level from the point where said perpendicular line strikes said surface to said object, a cathode ray tube having a screen and having means for producing a cathode ray and directing it at said screen, means for transmitting radio pulses toward the earth from said aircraft and for initiating alternately at approximately the time of transmission of each pulse a vertical deflection of the cathode ray to produce a vertical time trace on said screen and a horizontally displaced vertical deflection of the cathode ray to produce a second vertical time trace on said screen with the rate of movement of the cathode ray along the first trace being substantially faster than along the second trace, said time traces having time bases that have a predetermined relation to each other, means for receiving said pulses after reflection from said surface and from said object, means for applying the received pulses to said tube to alter the cathode ray during its deflection to produce a visual indication whereby the altitude indication appears on the first trace and the object indication appears on the second trace, and an index line drawn over said screen to intersect the first trace where the altitude indication appears for a certain altitude and to intersect the other trace where the object indication appears for a certain value of said angle.

4. In a system for indicating on the screen of a cathode ray tube the angle between a line from an aircraft to a finite object on the earth's surface and a line perpendicular from the aircraft to the earth, the earth's surface being level from the point where said perpendicular line strikes said surface to said object, a cathode ray tube having a screen and having means for producing a cathode ray and directing it at said screen, means for transmitting radio pulses toward the earth from said aircraft and for initiating alternately at approximately the time of transmission of each pulse a vertical deflection of the cathode ray to produce a vertical time trace on said screen and a horizontally displaced vertical deflection of the cathode ray to produce a second vertical time trace on said screen with the rate of movement of the cathode ray along the first trace being substantially faster than along the second trace, said time traces having time bases that have a predetermined relation to each other, means for receiving said pulses after reflection from said surface and from said object, means for applying the received pulses to said tube to alter the cathode ray during its deflection to produce a visual indication whereby the altitude indication appears on the first trace and the object indication appears on the second trace, and a plurality of index lines drawn over said screen to intersect said traces, each line intersecting the first trace where the altitude indication appears for a certain altitude and intersecting the other trace where the object indication appears for a certain value of said angle.

5. In a system for indicating on the screen of a cathode ray tube the angle between a line from an aircraft to a finite object on the earth's surface and a line perpendicular from the aircraft to the earth, the earth's surface being level from the point where said perpendicular line strikes said surface to said object, a cathode ray tube having a screen and having means for producing a cathode ray and directing it at said screen, means for transmitting radio pulses toward the earth from said aircraft in left-right overlapping radiation patterns and for initiating alternately at approximately the time of transmission of each pulse a vertical deflection of the cathode ray to produce a vertical time trace on said screen and a horizontally displaced vertical deflection of the cathode ray to produce a second vertical time trace on said screen, said time traces having time bases that have a predetermined relation to each other, means for receiving said pulses after reflection from said surface and from said object, means for applying the received pulses to said tube to alter the cathode ray during its deflection to produce a visual indication whereby at least the altitude indication appears on the first trace and at least the object indication appears on the second trace, a plurality of index lines drawn over said screen to intersect said traces, each line intersecting the first trace where the altitude indication appears for a certain altitude and intersecting the other trace where the object indication appears for a certain value of said angle, and switching means for producing said first and second vertical traces during pulse transmission in the left radiation pattern and for next producing them during pulse transmission in the right radiation pattern.

WILLIAM D. HERSHBERGER.

REFERENCES CITED

The following references are of record in the file of this patent:

UNITED STATES PATENTS

| Number | Name | Date |
|---|---|---|
| 364,630 | Bowyer | June 14, 1887 |
| 1,408,504 | Hammond et al. | Mar. 7, 1922 |
| 1,800,931 | Dugan | Apr. 14, 1931 |
| 2,056,216 | Somers et al. | Oct. 6, 1936 |
| 2,183,634 | Zworykin | Dec. 19, 1939 |
| 2,189,549 | Hershberger | Feb. 6, 1940 |
| 2,225,046 | Hunter | Dec. 17, 1940 |
| 2,400,641 | Hardy | May 21, 1946 |
| 2,405,231 | Newhouse | Aug. 6, 1946 |
| 2,412,702 | Wolff | Dec. 17, 1946 |